United States Patent [19]

Tapert

[11] 3,930,928
[45] Jan. 6, 1976

[54] AUTOMATIC COVER SLIPPER FOR MICROSCOPE SLIDES

[76] Inventor: Thomas J. Tapert, 243 Minnesota, Troy, Mich. 48084

[22] Filed: July 18, 1974

[21] Appl. No.: 489,830

[52] U.S. Cl. .............. 156/556; 156/572; 156/578; 350/92
[51] Int. Cl.² .................. B32B 31/12; G02B 21/34
[58] Field of Search ............ 156/578, 103, 104, 99, 156/556, 572, 569, 295, 57; 350/92

[56] References Cited
UNITED STATES PATENTS

| | | | |
|---|---|---|---|
| 3,480,504 | 11/1969 | Good et al. | 156/556 |
| 3,715,258 | 2/1973 | Cunnane | 156/578 X |
| 3,833,449 | 9/1974 | Johnson | 156/572 X |
| 3,834,966 | 9/1974 | Kelly | 156/569 X |

Primary Examiner—Douglas J. Drummond
Assistant Examiner—M. G. Wityshyn
Attorney, Agent, or Firm—Cullen, Settle, Sloman & Cantor

[57] ABSTRACT

An automatic cover slipper for microscope slides has a base with guide means to mount a manually reciprocating slide having an advance position and a retracted position. The base has a pair of transverse apertures to receive a microscope slide and a stack of slide covers, respectively. A slide cover lifter assembly is mounted on the slide and includes a depending suction cup for manually gripping and lifting a slide cover when the slide is in advance position. A cement dispenser assembly with a reservoir is mounted on the slide and has a control valve for automatically dispensing a measured amount of cement onto the microscope slide when the reciprocating slide is in advance position. The lifter assembly on movement to retracted position is adapted to transfer the cover into registry with the microscope slide and for dropping the cover thereon in juxtaposition.

7 Claims, 4 Drawing Figures

AUTOMATIC COVER SLIPPER FOR MICROSCOPE SLIDES

BACKGROUND OF THE INVENTION

Heretofore in the use of microscope slides, after the slide has been completed with the specimen thereon and stained, it is necessary to apply a thin, transparent, protective cover thereon. In the past this has been done by first applying a small amount of cement or glue to the microscope slide and thereafter manually applying a glass or thin plastic cover over the microscope slide for registry therewith. One of the difficulties has been the correct juxtaposition manually of the cover onto the microscope slide. Another problem has resided in the entrapment of air bubbles between the cover and slide during the manual assembly operation.

BRIEF DESCRIPTION OF THE INVENTION

It is an object of the present invention to provide an automatic cover slipper for microscope slides wherein the operation of applying cement to the microscope slide and the lifting of a slide cover is done in the mechanical fashion on forward movement of the slide and the transporting of the cover is likewise accomplished by moving the slide cover into registry with the microscope slide and dropping it down thereonto in juxtaposition therewith.

It is another object to provide an improved automatic cover slipper for microscope slides by which a manually reciprocating slide mounts a slide cover lifter assembly with depending suction cup as well as a cement dispenser assembly in such fashion that in one position of the slide the cement is dispensed upon a microscope slide therebelow and at the same time the cover lifter is adapted to engage and lift the slide cover from a stack and thereafter on retraction of the slide deliver the cover into registry with the microscope slide and for dropping the same thereover in juxtaposition and without the formation of bubbles between the slide and cover.

It is another object to provide an improved slide cover lifter assembly with suction cup and manual control by which the suction cup grips the cover in such manner as to lift and maintain the same in a plane inclined to the longitudinal axis of the lifter and while in this position transmit the cover to a secondary position in registry with the microscope slide and for dropping the cover thereon so that it folds over the microscopic slide in such manner as to prevent the accumulation of air bubbles between the cover and microscope slide.

It is a further object to provide an improved cement dispenser assembly mounted upon the slide of the present device wherein when the slide has reached an advanced position there is an automatic dispensing of a measured amount of cement onto the slide so that upon retraction of the slide the slide cover which has been lifted from the base has been transported into registry with the microscope slide for lowering thereover into juxtaposition therewith.

These and other objects will be seen from the following specification and claims in conjunction with the appended drawings in which:

THE DRAWINGS

It will be understood that the above drawings illustrate merely a preferred embodiment of the invention, and that other embodiments are contemplated within the scope of the claims hereafter set forth.

DETAILED DESCRIPTION OF THE INVENTION

Figure 1:
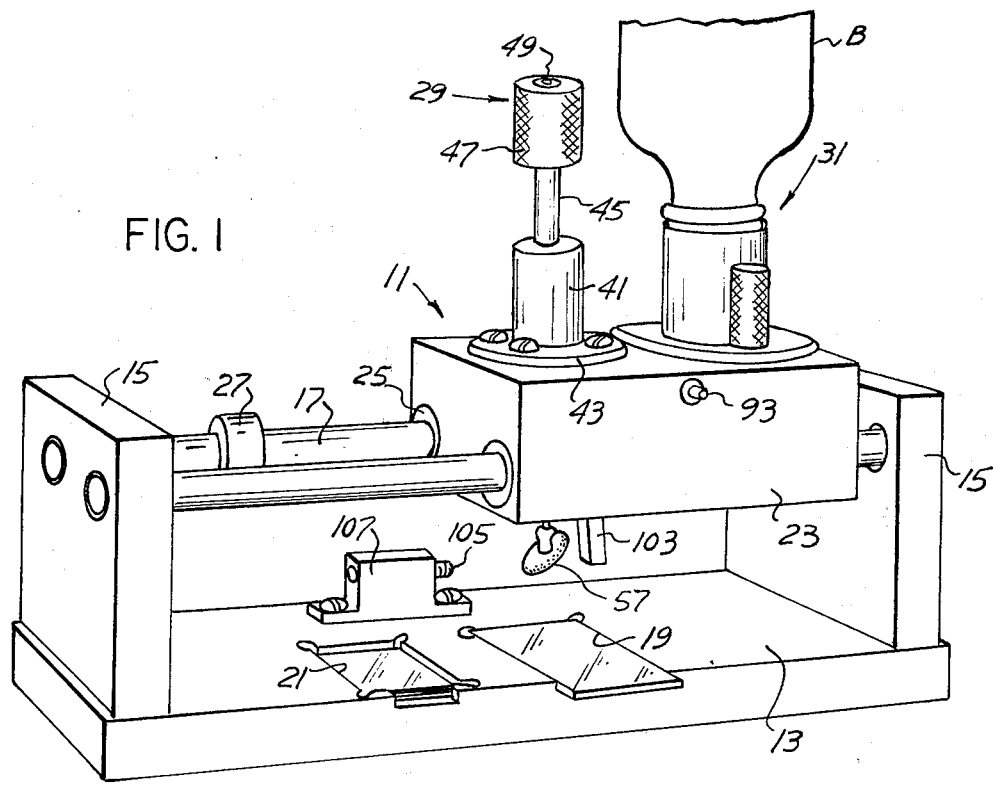
FIG. 1 is a perspective view of the present automatic cover slipper for microscope slides.

Referring to the drawings, the present automatic cover slipper is shown at 11 in FIG. 1 and includes base 13 having at its opposite ends a pair of upright end plates 15.

A pair of parallel spaced guide support rods 17 are spaced above said base with their respective ends anchored in the end plates 15 to provide a guide means for the manually reciprocating slide 23.

Formed upon the base 13 are a pair of parallel spaced transverse recesses 19 and 21. Recess 19 is open at one end and is adapted to receive a microscope slide such as shown in FIG. 1.

The receptacle 21 is partly closed at its ends in order to hold a stack of thin glass or plastic slide covers against relative transverse or longitudinal movement.

Slide 23 has a pair of corresponding longitudinal bores with ball bushings 25 adapted to slidably receive rods 17. Said slide has a forward position shown in FIG. 3 with said slide engaging the stop 27 on said rods. It also has a retracted position such as shown in FIG. 1.

As shown in FIG. 1, mounted upon the manually reciprocating slide is a slide cover lifter assembly 29 and spaced longitudinally thereof a cement dispenser assembly 31.

Figure 2:
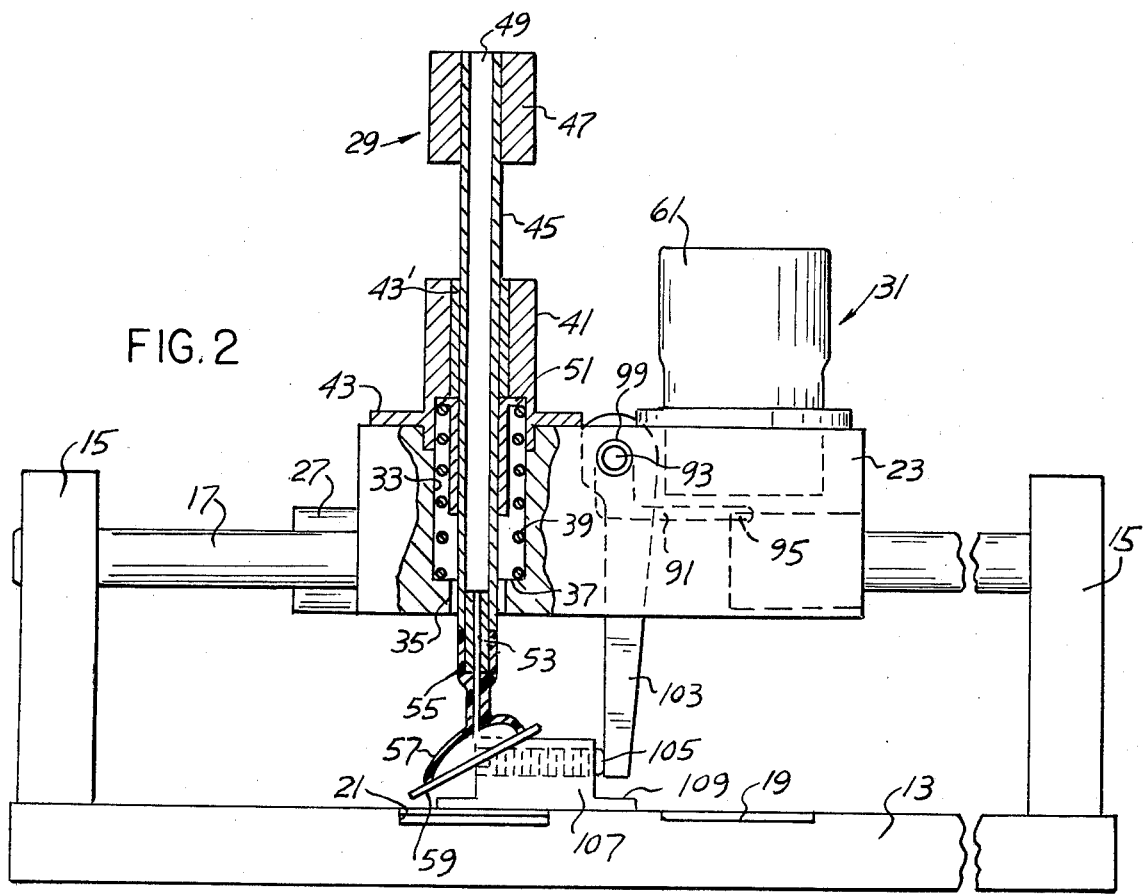
FIG. 2 is a fragmentary side elevational view thereof.

Bore 35 and counter-bore 33, FIG. 2, receive the slide cover lifter assembly. Elongated coil spring 39 is disposed within said bore and rests upon the shoulder 37 defined by counter-bore 33. The cylindrical lifter guide 41 has intermediate its ends a circular mounting flange 43 which registers with the top of said slide and is suitably secured thereto by fasteners as in FIG. 1. Said guide has a longitudinal bore receiving bushing 43 through which is projected the elongated lifter tube 45 having a handle 47 with bore 49 in communication with the bore of said tube.

The disc 51 secured to said tube intermediate its ends is positioned within an enlarged bore of the guide and rests upon the coil spring 39. Said tube extends through the bore 35 and below the base 23 and mounts an adapter 53 over which is removably supported a suction head 55 having a flexible suction cup 57.

As shown in FIG. 2, the peripheral margin of said suction cup is arranged at an acute angle as at 59 with respect to the longitudinal axis of the tube to facilitate the engagement and application of the suction cup to the top most cover in the cover receptacle 21 when said tube 45 has been manually lowered by application of handle 47 against the action of spring 39.

Upon releasing downward pressure to the handle, and with a finger over the open bore of said handle at 49, spring 39 will return the lifter tube to the position shown in FIG. 2 with the cover slide secured to the suction cup and maintained in a plane corresponding to the plane shown at 59, FIG. 2.

Figure 4:
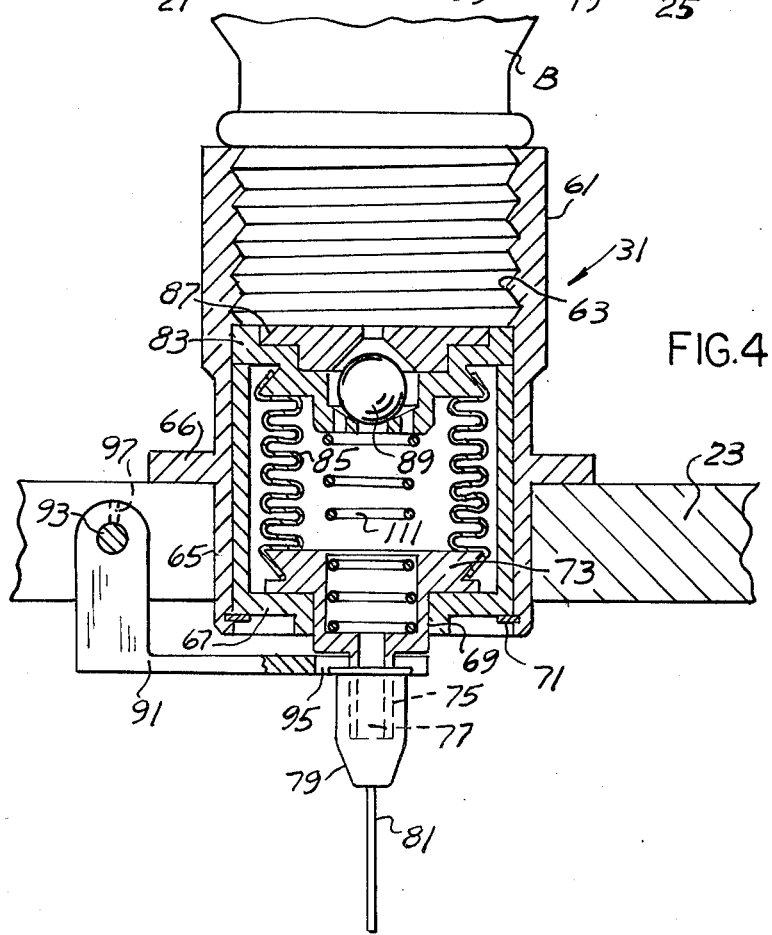
FIG. 4 is a fragmentary view corresponding to FIG. 2, but on an increased scale illustrating the construction of the cement dispenser assembly.

The present cement dispenser assembly 31, FIG. 2, includes a reservoir designated at B in the form of a bottle containing a suitable adhesive or cement which in an inverted position, FIG. 4, has its neck projected down into the threaded portion 63 of the cylindrical body 61, FIG. 4.

Said body is arranged in an upright position and projected down through the bore 65 in the slide, and includes an annular mounting flange 66 which registers with the top of said slide and is secured thereto by suitable fasteners such as shown in FIG. 1.

The cement dispenser assembly includes the bellows end plate support 67 anchored within the lower depending open end of said body as by the snap ring 71. Vertically adjustable end plate 73 is movably and guidably mounted upon the support plate 67 and has an adapter 75 with outlet bore 77 adapted to receive thereover cement dispenser 79. Said dispenser has depending therefrom and communicating therewith the axial apertured dispenser needle 81, FIG. 4.

Within the body 61 intermediate its ends there is provided a stationary bellows end plate 83 which supportably receives the upper end of the flexible bellows 85. The lower end of said bellows engages around the annular side portion of the end plate 73 to thus define a chamber upon the interior of said bellows which is in communication with the ball valve 89. Said valve is mounted within end plate 83 and with respect to an apertured seat 87.

The chamber upon the interior of said bellows is therefore in communication with the ball valve 89 permitting liquid cement to accummulate within said bellows.

Arranged directly below said bellows is a bellows actuator 91 in the form of a cantilever with one end anchored as at 97 to the transverse rock shaft 93 which is journalled within suitable bearings 101 within the slide 23.

Figure 3:
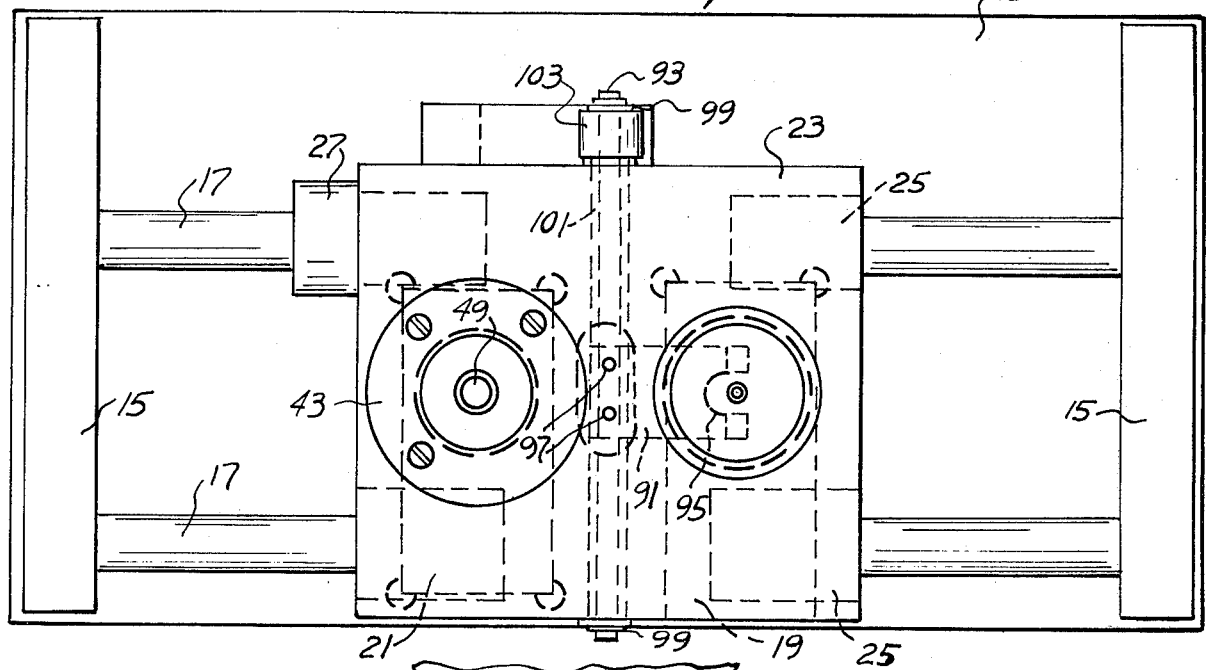
FIG. 3 is a fragmentary plan view thereof.

The other end of said cantilever is bifurcated as at 95 so as to be positioned around the lower end portion of the adapter 75 depending from the vertically adjustable bellows end plate 73. Suitable snap rings 99 anchor the pivot bar 93 with respect to said slide. Lever arm 103 is secured to the free end of the pivot bar 93 and depends therefrom as shown in FIGS. 2 and 3.

The adjustable screw 105 is arranged within the block 107 anchored upon the base at 109 and is normally in the path of forward movement of the lever arm 103. Just before the slide reaches the position shown in FIG. 3, engagement of the lever 103 with the stop on continued movement of the slide 23, rotates the arm 103 counterclockwise a short distance effecting a corresponding counterclockwise movement of the bifurcated end 95 of the actuator 91, FIG. 3. This lifts the bottom plate 73 against the action of coil spring 111 compressing the bellows 85 automatically seating the ball valve 89 and at the same time extruding a measured limited quantity of cement through the adapter 77 and the cement dispensing needle 81 down onto the microscope slide therebelow. Just as soon as the slide is retracted, the bellows 85 expands to the position shown in FIG. 4 under the action of the spring 111 ready for the next actuation.

When said slide is retracted to the position shown in FIG. 1, the handle 47 is then depressed. This places the slide cover directly over the prepared microscope slide, with one longitudinal edge upon the slide. The finger is then removed from bore 49, releasing the vacuum in cup 57. The slide cover folds down into juxtaposition position with the slide. No air is entrapped between the slide and cover.

Having described my invention, reference should now be had to the following claims.

I claim:

1. In an automatic cover slipper for microscope slides; a base with spaced upright end walls;
   guide means above said base interconnecting said walls;
   a manually reciprocating slide on said guide means having an advanced and a retracted position;
   there being a pair of parallel spaced transverse slots in said base adapted to receive a microscope slide, and a stack of slide covers respectively;
   a slide cover lifter assembly on said reciprocating slide including a depending suction cup overlying and in the advanced position of said reciprocating slide adapted for engaging registry with a slide cover for lifting it off the stack;
   a cement dispenser assembly on said reciprocating slide spaced longitudinally of said lifter assembly, mounting a cement reservoir and including a control valve adapted to deliver a drop of cement upon said microscope slide; said lifting assembly on movement of the reciprocating slide to retracted position adapted to transfer the slide cover into registry with the microscope slide and for dropping the slide cover into juxtaposition thereon;
   said slide cover lifter assembly including a lifter guide sleeve secured upon said reciprocating slide; there being a bore and a counter-bore in the reciprocating slide in axial registry with said sleeve;
   a spring in said counter bore;
   a lifter tube guidably projected through said sleeve and yieldably mounted on said spring, supporting said suction cup at its lower end;
   and an apertured handle upon the upper end of said tube, said handle aperture communicating with the lifter tube and suction cup.

2. In the cover slipper of claim 1, a slide stop on said guide means limiting forward movement of the reciprocating slide to advanced position; one end wall limiting return movement of the reciprocating slide to retracted position.

3. In the cover slipper of claim 1, said guide means including a pair of parallel spaced rods between said walls; said reciprocating slide having a corresponding pair of longitudinal bores receiving said rods.

4. In the cover slipper of claim 1, the slot in said base for said slide covers being closed at its ends holding said covers against longitudinal and transverse movements; the base slot for said microscope slide being open at its outer end to facilitate loading and unloading.

5. In the cover slipper of claim 1, said suction cup having an apertured shank connected to said tube in communication with the bore of said tube; manual lowering of said tube flexing said suction cup against a slide cover, said spring adapted to retract said tube and suction cup with the bore of said tube closed manually, whereby on movement of the reciprocating slide to retracted position, and manual lowering of said tube and suction cup, the bore of said tube when opened permitting the transported slide cover to drop upon said microscope slide.

6. In the cover slipper of claim 5, the rim of said suction cup lying in a plane inclined at an acute angle to the tube axis, so that the cover when lifted lies in a corresponding plane whereby the cover when deposited upon the microscope slide folds over into registry therewith preventing air entrapment between the cover and microscope slide.

7. In an automatic cover slipper for microscope slides; a base with spaced upright end walls;
  guide means above said base interconnecting said walls;
  a manually reciprocating slide on said guide means having an advanced and a retracted position;
  there being a pair of parallel spaced transverse slots in said base adapted to receive a microscope slide, and a stack of slide covers respectively;
  a slide cover lifter assembly on said reciprocating slide including a depending suction cup overlying and in the advanced position of said reciprocating slide adapted for engaging registry with a slide cover for lifting it off the stack;
  a cement dispenser assembly on said reciprocating slide spaced longitudinally of said lifter assembly, mounting a cement reservoir and including a control valve adapted to deliver a drop of cement upon said microscope slide; said lifting assembly on movement of the reciprocating slide to retracted position adapted to transfer the slide cover into registry with the microscope slide and for dropping the slide cover into juxtaposition thereon;
  said cement dispenser assembly including an upright cylindrical body mounted on and projected through said reciprocating slide;
  said reservoir including a bottle of cement inverted with its neck supported within the upper end of said body;
  said control valve being a ball check valve within said body;
  a bellows suspended within said body having a chamber adapted to receive cement from said bottle;
  a vertically adjustable end plate on said bellows mounted on and depending from said body, having an outlet;
  an apertured adapter mounted over said outlet and including a depending apertured dispenser needle;
  a bellows actuator on said reciprocal slide operably engageable with said adjustable bellows end plate for momentarily compressing the bellows and expelling a measured quantity of cement through said needle;
  said bellows actuator including a transverse rock shaft journalled upon said reciprocating slide;
  a cantilever secured to said rock shaft and having a bifurcated end operatable registerable with said bellows end plate;
  a control arm secured to and depending from said rock shaft;
  and a stop on said base in the path of forward movement of said control arm, whereby when the reciprocating slide is moved to advance position, the arm is tilted by said stop actuating said cantilever and expelling a drop of cement down onto the microscope slide.

* * * * *